3,020,292
VINYL 9,10-EPOXYSTEARATE

Daniel Swern, Philadelphia, Pa., assignor to the United States of America as represented by the Secretary of Agriculture
No Drawing. Filed July 13, 1954, Ser. No. 443,182
1 Claim. (Cl. 260—348)
(Granted under Title 35, U.S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to a new polymerizable monomer, vinyl 9,10-epoxystearate, to methods for the preparation and polymerization of said monomer and to uses for polymers thereof.

It is well known that olefinic compounds, for instance, oleic acid, soybean oil, and olefinic hydrocarbons, are in general readily epoxidized by treatment with an organic peracid or with a combination of hydrogen peroxide and a suitable organic acid.

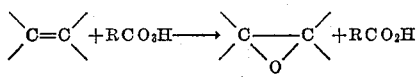

It is also well known that esters polymerize readily and that hydrogen peroxide, peracids and other peroxy compounds are potent catalysts which initiate and accelerate such polymerization.

In view of the above prior knowledge it would have been expected that treatment of vinyl oleate with hydrogen peroxide, a peracid, or other peroxy compound would produce one of the following results:

(a) Epoxidation of both the oleate and the vinyl groups;
(b) Polymerization of the vinyl groups, followed perhaps by epoxidation of the oleate groups;
(c) Epoxidation of the oleate groups, accompanied by polymerization of the vinyl groups;
(d) Preferential oxidation of the vinyl group.

I have now discovered a process whereby vinyl oleate can be substantially completely epoxidized in the alkyl chain to form vinyl 9,10-epoxystearate without appreciable polymerization of either the oleate or the epoxystearate and without any significant oxidation of the vinyl group.

According to the invention, vinyl oleate is dissolved in a suitable solvent and treated with an equimolar, ratio of an organic peracid or a reagent that produces such a peracid in situ. The epoxidation proceeds smoothly at ordinary temperatures and is complete in a few hours. The vinyl 9,10-epoxystearate is then recovered by any suitable means, such as evaporation of the solvent or dilution with water.

The solvent may be any that will dissolve the reagents and is inert toward them, such as carbon tetrachloride, benzene, dioxane, ethyl acetate or acetone. It may also be the acid corresponding to the peracid used as a reagent, provided the acid is a liquid with suitable solvent properties. The preferred class of solvents consists of the saturated lower aliphatic monocarboxylic acids, particularly formic and acetic acid. These acids are solvents for the reagents and the product; they are readily removed from the product by vacuum distillation or washing with water; they are readily available and are inexpensive.

Acetic and formic acids are especially suitable solvents for use when the peracid reagent is to be formed in situ by the reaction of hydrogen peroxide with an organic acid. In such cases, the formic or acetic acid serves both as a solvent and as a reagent to react with the hydrogen peroxide to form the corresponding peracid.

The epoxidation of vinyl oleate is illustrated by the following example:

One hundred and eighty-five grams (1 mole) of commercial 40% peracetic acid was treated with 20 g. of sodium acetate trihydrate to neutralize any sulfuric acid which it might contain. The resulting neutralized peracid was diluted to 250 ml. with acetic acid and then it was slowly added at 30° C. with stirring to 308 g. (1 mole) of vinyl oleate diluted to 750 ml. with acetic acid. After about 2½ hours reaction at 30°, analysis indicated that consumption of peracid had virtually ceased, and the reaction mixture was poured into about 2 liters of water. The upper oily layer was washed successively with water, dilute sodium bicarbonate solution and water. The yield of crude vinyl 9,10-epoxystearate was 315 g. (calculated, 324 g.). Its oxirane oxygen content was 4.16% (calculated 4.9%). The conversion, therefore, was about 85%.

Substantially pure vinyl 9,10-epoxystearate was obtained by recrystallization of the crude product from acetone at —30°. The resulting product had an oxirane oxygen content of 4.74% and a refractive index at 30° (D line of sodium) of 1.453. Replacement of the peracetic acid used above with an equivalent amount of performic or perbenzoic acid or $H_2O_2$ did not significantly affect the results.

Vinyl 9,10-epoxystearate is a unique compound in that it contains both an epoxy and a vinyl group, two very versatile and reactive groupings. This versatility makes the compound of great value as a chemical intermediate and as a monomer for use in the plastics industry. The value of the epoxy group as a stabilizer for halogen-containing vinyl resins is well known. Epoxidized soybean oil, for instance, is used commercially for this purpose, as well as for its utility as a secondary plasticizer. It is known, however, that when such an epoxy compound is incorporated into a halogen-containing resin, the stabilizing effect is due to the reaction

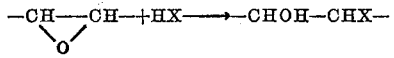

and the halo-hydroxy compound formed in the reaction is usually incompatible with the resin and exudes, thus greatly diminishing the usefulness of the material. Vinyl 9,10-epoxystearate, by virtue of its readily polymerizable vinyl group, easily forms homopolymers as well as copolymers with other polymerizable vinyl compounds. If, as in the case of vinyl chloride, the other monomer alone yields a polymer that is hard and unworkable, its copolymers with vinyl 9,10-epoxystearate not only are stabilized toward light and heat but are also softened and plasticized.

In general, if only the stabilizing effect is desired, a minor amount, say about 1–10%, of vinyl 9,10-epoxystearate is incorporated into the copolymer. If in addition it is desired to lower the milling temperature of the copolymer without sacrificing the strength and rigidity of the product, about 10–20% of vinyl 9,10-epoxystearate may be used. Finally, if a soft, flexible copolymer is desired, about 20–50% of vinyl 9,10-epoxystearate may be used. In any case, since the vinyl 9,10-epoxy-stearate is an integral part of the resin, it can never evaporate, exude or migrate; hence its stabilizing and/or plasticizing effect is permanent.

Polyvinyl epoxystearate, readily made by the conventional free radical polymerization of the monomer, as well as copolymers of vinyl 9,10-epoxystearate with other polymerizable vinyl monomers, are useful as polymeric plasticizer-stabilizers for most synthetic resins requiring such agents. Thus cellulose esters, particularly the acetate, acetate-butyrate and the nitrate are subject to deterioration by heat or light unless stabilized, and in addition they require plasticization for most uses. Polymers and copolymers of vinyl 9,10-epoxystearate, particularly those of relatively low molecular weight are of exceptional value for this purpose.

I claim:

Vinyl 9,10-epoxystearate.

References Cited in the file of this patent

UNITED STATES PATENTS

| | | |
|---|---|---|
| 2,448,602 | Kester et al. | Sept. 7, 1948 |
| 2,485,160 | Niederhauser et al. | Oct. 18, 1949 |
| 2,559,177 | Terry et al. | July 3, 1951 |
| 2,680,109 | Stevens et al. | June 1, 1954 |
| 2,785,185 | Phillips et al. | Mar. 12, 1957 |

OTHER REFERENCES

Greenspan et al.: Ind. Eng. Chem., vol. 45, December 1953, pages 2722–2726.

Report of Progress Under National Renderer's Association Fellowship, Agricultural Research Service, U.S. Dept. of Agric., delivered July 2, 1954, 5 pages.

Silbert et al.: Abstract of Papers, 127th A.C.S. Meeting, March 27–April 7, 1955, page 30N.